March 25, 1941. W. C. KLEIN 2,236,433
LAWN MOWER
Filed Aug. 22, 1940 3 Sheets-Sheet 1
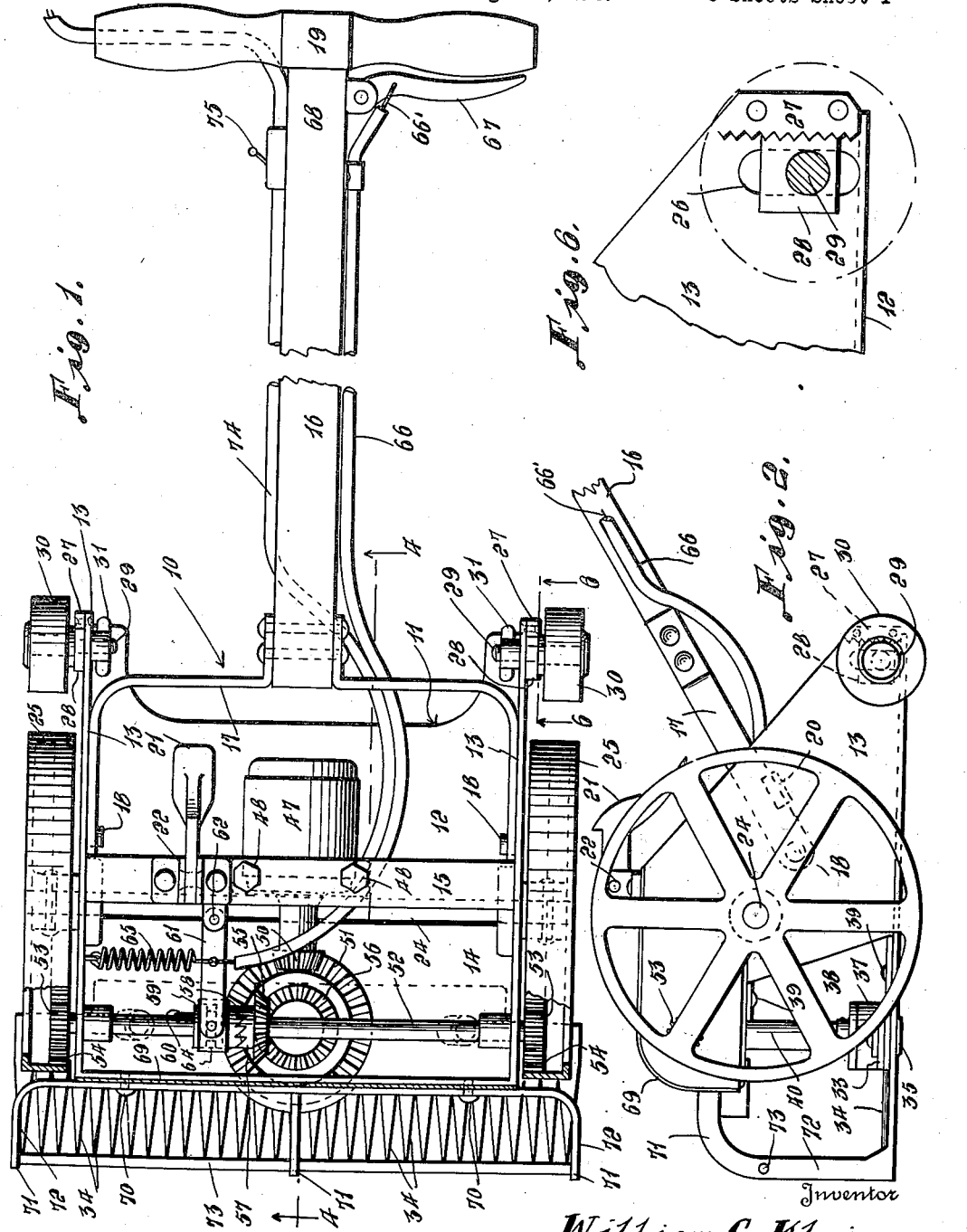
Inventor
William C. Klein
By L. F. Randolph
Attorney

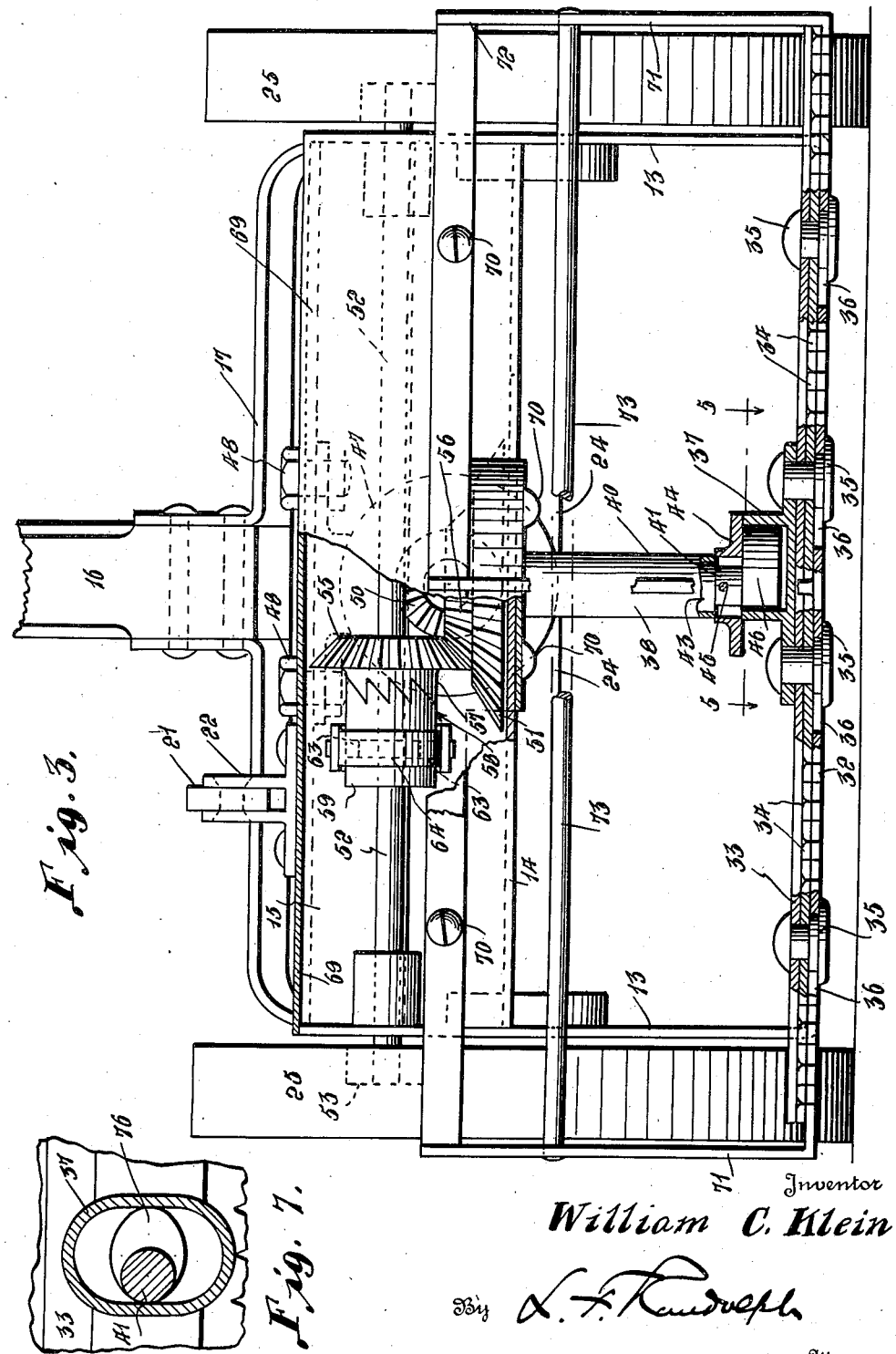

March 25, 1941.  W. C. KLEIN  2,236,433
LAWN MOWER
Filed Aug. 22, 1940  3 Sheets-Sheet 3
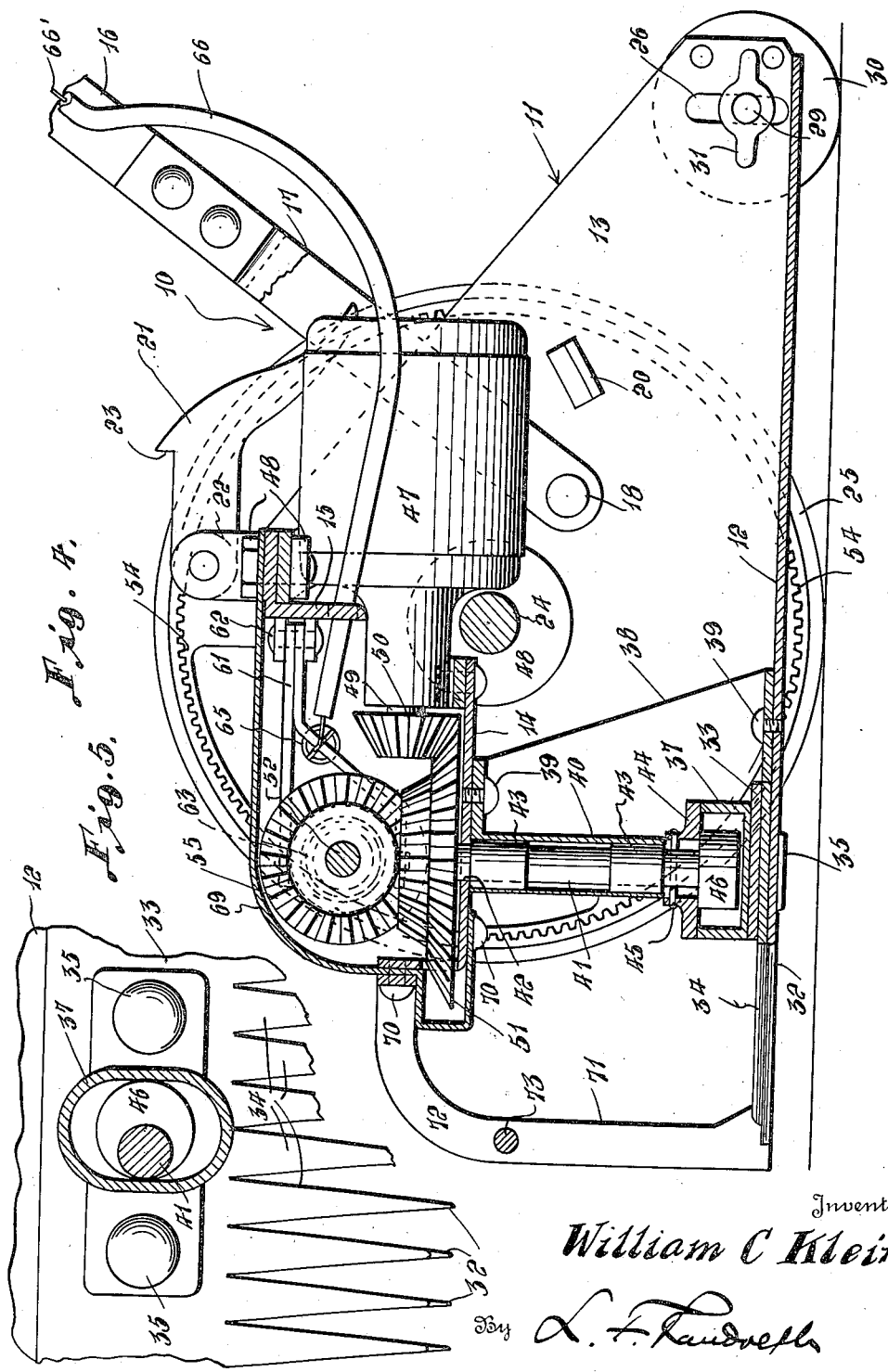
Inventor
William C Klein
By L. F. Laudvess
Attorney Patented Mar. 25, 1941

2,236,433

UNITED STATES PATENT OFFICE 2,236,433

LAWN MOWER

William C. Klein, Allentown, Pa.

Application August 22, 1940, Serial No. 353,757

8 Claims. (Cl. 56—26.5)

This invention relates to an improved construction of lawn mower of the type provided with a reciprocating cutter including a fixed cutting knife and a reciprocating cutting bar having teeth to cooperate with teeth of the cutting knife to form a clipper type cutter.

More particularly, it is an aim of the invention to provide a lawn mower equipped with an electric motor for actuating the reciprocating cutter and for driving the ground wheels of the mower for propelling the lawn mower.

Still another aim of the invention is to provide improved clutch means for disengaging the means for driving the ground wheels so that the reciprocating cutter may be driven independently thereof and the mower propelled manually for cutting around and adjacent to shrubbery, trees, buildings and other obstructions.

Other objects and advantages of the invention will hereinafter become more fully apparent from the following description of the drawings, which illustrate a preferred embodiment thereof, and wherein—

Figure 1 is a top plan view, partly in section, of a lawn mower constructed in accordance with the invention, Figure 2 is a fragmentary side elevational view of the same, Figure 3 is an enlarged front elevational view partly in section, Figure 4 is an enlarged vertical sectional view taken substantially along the plane of the line 4—4 of Figure 1, Figure 5 is an enlarged horizontal sectional view taken substantially along the plane of the line 5—5 of Figure 3, Figure 6 is an enlarged vertical sectional view taken substantially along the plane of the line 6—6 of Figure 1, and Figure 7 is a view similar to Figure 5 of a slightly different construction of eccentric.

Referring more particularly to the drawings, wherein like reference characters designate like or corresponding parts throughout the different views, 10 designates generally the lawn mower including a frame 11 composed of a base plate 12 having upset sides 13. The sides 13 are connected and braced by the brace members 14 and 15 which extend therebetween and which are angular in cross section.

The lawn mower 10 is provided with a conventional staff 16 having a forked end 17 the prongs of which are pivotally connected by studs 18 to the sides 13. The staff 16 is provided at its opposite end with a conventional handle 19. The sides 13 are provided with stops 20 for limiting the downward swing of the staff 16. A latch member 21 is pivotally connected to a bracket 22 which is mounted on the brace 15. The latch 21 is connected to the bearing 22 by means of a conventional spring hinge or pivot, not shown, for yieldably retaining the latch in a raised position, as seen in Figure 4. The latch 21 is adapted to be engaged by one of the prongs of the fork 17 when the staff 16 is swung upwardly to retract the latch to permit said prong to move into engagement with the shoulder 23 for holding the staff 16 in substantially a perpendicular position relatively to the base 12, for a purpose which will hereinafter be described. The staff 16 may be readily released from this position by a downward pressure on the outer free end of the latch 21 which may be operated as a foot pedal.

An axle 24 is journaled adjacent its ends in the sides 13. A wheel 25 is keyed to each end of the axle 24, the wheels 25 being disposed on the outer sides of the sides 13 and forming the ground wheels of the lawn mower. The sides 13, adjacent their rear ends are provided with perpendicular slots 26 along one side of each of which is disposed a toothed bar 27. A toothed block 28 is in mesh with each of the toothed bars 27. Each of the blocks 28 has a bolt 29 extending therethrough. A roller 30 is journaled on the outer end of each of the bolts 29 and the inner ends of the bolts 29 are provided with wing nuts 31 for holding the blocks 28 in position and in engagement with the bars 27. It will be obvious that the wing nuts 31 may be loosened to permit the blocks 28 to be drawn outwardly for disengaging the teeth of the blocks from the teeth of the bars 27 so that the rollers 30 may be raised or lowered and thus secured in a plurality of adjusted positions for a purpose which will hereinafter be described.

The forward edge of the plate 12 is provided with tapered teeth which are sharpened on their opposite edges to form a fixed cutting knife 32. A cutter bar 33 which is provided with similar forwardly projecting teeth 34 is mounted on the cutting knife 32. The cutter bar 33 is connected to the cutting knife 32 by the bolts 35 which engage the elongated slots 36 in the cutting knife 32 which permit the cutter bar 33 to slide longitudinally of the cutting knife 32 and transversely of the lawn mower 10. Two of the fastenings 35 also extend through flanges of a socket member 37 to attach the socket member to the upper side of the cutter bar 33. The socket member 37 is open at its top, and as best seen in Figure 4 is oval shaped, being elongated transversely of the cutter bar 33.

A pedestal 38 is secured at its lower end by fastenings 39 to the base 12 and at its upper end by similar fastenings to the under side of the brace 14. The pedestal 38 is provided with a perpendicular sleeve portion 40 which is disposed above and spaced from the socket 37. The perpendicular shaft 41 extends through the sleeve 40 and through an opening 42 in the horizontal portion of the brace 14. The shaft 41 is journaled in bearings 43 formed in the sleeve 40 and is provided at its lower end with a wear plate 44 which is secured thereto by the pin 45 and which is disposed below the lower end of the sleeve 40 and in engagement with the upper edge of the socket 37. As best seen in Figure 5, a disk or circular member 46 is eccentrically connected to the lower end of the shaft 41 and disposed in the socket 37. The disk 46 is of a diameter substantially equal to the width of the socket 37 so that when the shaft 41 is revolved the socket 37 will be moved back and forth by the rotation of the disk 46 disposed therewithin to reciprocate the bar 33 relatively to the stationary knife 32. As best seen in Figure 3, the wear plate 44 is substantially wider than the socket 37 so as to cover the socket throughout its movements to prevent dirt from accumulating therein and to prevent the escape of a lubricant, not shown, with which the socket 37 is adapted to be filled.

An electric motor 47 is connected by fastenings 48 to the braces 14 and 15. Motor 47 is provided with a driven shaft 49 having a beveled gear 50 for meshing with a large beveled gear 51 which is keyed to the shaft 41 and disposed above the horizontal portion of the brace 14 for driving the shaft 41 to reciprocate the cutter bar 33.

An axle 52 is journaled adjacent its ends in the sides 13 and is provided with pinions 53 which are disposed beyond the sides 13 and within the wheels 25 to mesh with internal gears 54 which are formed on the inner sides of the rims of the wheels 25. A beveled gear 55 is rotatably mounted on the axle 52 to mesh with a beveled gear 56 which is keyed to the perpendicular shaft 41 and disposed above the beveled gear 51. The beveled gear 56 is substantially smaller than the beveled gear 51. Beveled gear 55 is provided with a hub 57 which projects from the back side thereof and which is toothed to form one portion of a clutch, designated generally 58, the other half of which comprises a sleeve 59 which is slidably mounted on the axle 52 and which is provided with a pin, not shown, for slidably engaging an elongated slot 60 in the axle 52 for keying the sleeve 59 thereto. The sleeve 59 is likewise toothed to mesh with the teeth of the hub 57, as illustrated in Figure 3, when the clutch is in an engaged position to thereby cause the axle 52 to be driven from the shaft 41 for driving the ground wheels 25 through the pinion and internal gear connections 53 and 54, respectively, to propel the lawn mower 10.

The lever 61 is pivotally connected at one end at 62 to the vertical portion of the brace 15 and is provided with an opposite, bifurcated end, as best seen in Figure 4, the furcations of which are provided with inwardly projecting studs 63, as best seen in Figure 3, which loosely engage in a groove 64 in the clutch section 59. A contractile coil spring 65 is connected at one end to a side 13 and at its opposite end to the lever 61 for normally swinging the lever 61 in a direction to move the clutch section 59 away from the clutch section 57 to disengage the sections for releasing the clutch. A flexible conduit 66 is secured along one side of the staff 16 and has one end extending to adjacent the lever 61 and the opposite end terminating adjacent the handle 19. A strand of wire 66′ is connected at one end to the intermediate portion of the lever 61 and at its opposite end to a lever 67 which is pivotally connected at 68 to one side of the staff 16 for positioning the lever 67 beneath and adjacent to one end of the handle 19. Lever 67 is adapted to be pulled toward the handle 19 for moving the clutch section 59, through the lever 61, to a projected position and into engagement with the section 57 for engaging the clutch 58 to cause the ground wheels 25 to be driven by the motor 47.

A cover 69 is secured by means of fastenings 70 and 48 to the braces 14 and 15 for enclosing the gears 50, 51, 55 and 56, the clutch 58, the lever 61 and other adjacently disposed parts, which, as best seen in Figure 4, are disposed in elevated positions substantially above the base plate 12. A finder or guard 71 including a plurality of curved bars 72, each of which is secured by means of a fastening 70 to the brace 14 and which extend downardly to the forward end of the knife 32, is disposed in front of the parts disposed within the casing 69. The fender or guard 71 also includes a bar 73 which is mounted in the bars 72 and which extends transversely across the forward part of the lawn mower 10. The fender or guard 71 is provided to protect the driving mechanism of the lawn mower from obstructions which might otherwise damage said parts.

A flexible electrical conductor 74 extends from the electric motor 47 along the side of the staff 16, opposite to that on which is disposed the conduit 66 and through the end of the handle 19, opposite to that beneath which the lever 67 is disposed. Conductor 74 is provided with a switch 75 which is mounted on the staff 16 adjacent the handle 19 for energizing and deenergizing the electric motor 47.

Referring to Figure 7, the shaft 41 may be provided with an elliptical member 76 in lieu of the disk 46, the length of which is substantially equal to the diameter of the disk 46. The elliptical member 76, as seen in Figure 3, is disposed in the socket 37 and functions in the same manner as the disk 46 for reciprocating the cutter bar 33 when the shaft 41 is revolved.

From the foregoing it will be obvious that the operator of the lawn mower 10 can guide the lawn mower by holding the handle 19 and may energize and deenergize the motor 47 for operating the cutter bar 33. The lawn mower 10 may be pushed manually for cutting around bushes, shrubs, trees and buildings with the cutter bar 33 in operation for cutting even though the lawn mower is not being propelled. By removing the lever 67 toward the handle 19 the clutch 58 will be moved to an engaged position for driving the ground wheels 25 to propel the lawn mower from the motor 47 and by releasing the lever 67 the spring 65 will move the clutch 58 to a released position to stop the forward driven motion of the lawn mower. As previously stated the switch 75 may be operated by the operator of the mower when desired for turning off the motor 47 to stop the movement of the cutter bar 33. For moving the lawn mower 10 to and from a lawn to be mowed, for example, the staff 16 is swung upwardly and held by the latch 21, as previously explained, after which the lawn mower 10 may be rocked rearwardly and be supported on the rollers 30 with the wheels 25 in an elevated position, and in this manner the lawn mower 10 may be pushed without revolving the wheels 25 which will cause the axle 52 to be revolved. The rollers 30 may be raised and lowered, as previously explained, for rocking the frame 11 to raise and lower the cutting knife 32 and cutter bar 34 to cause said cutting means to clip at different elevations.

Various modifications and changes are contemplated and may obviously be resorted to as only a preferred embodiment of the invention has been disclosed.

I claim as my invention:

1. A lawn mower provided with a reciprocating cutter, an electric motor mounted on said lawn mower and provided with a horizontally disposed driven shaft, a perpendicular shaft, gear means for connecting said shaft to the driven shaft of the electric motor, eccentric means associated with said perpendicular shaft for actuating the reciprocating cutter, a horizontal shaft disposed crosswise of the driven shaft, gear means connecting the ends of said horizontal shaft to the ground wheels of the lawn mower, a beveled gear keyed to the perpendicular shaft, a beveled gear rotatably mounted on the horizontal shaft and meshing with said aforementioned beveled gear, and clutch means for keying said last mentioned beveled gear to the horizontal shaft for driving the wheels of the lawn mower.

2. A lawn mower as in claim 1, comprising spring means for normally retaining the clutch in a released position, a lever pivotally connected to the lawn mower staff and disposed adjacent the lawn mower handle, and flexible means connecting said lever and clutch for projecting the clutch into an engaged position.

3. A lawn mower as in claim 1, said electric motor and clutch being disposed in elevated positions relatively to the cutting means whereby the cut grass may pass therebeneath, a cover disposed around the clutch, the first and last mentioned gear means, and in front of the motor for shielding said parts from the cut grass and other foreign matter, and a guard disposed above the cutting means and in front of the electric motor and clutch for shielding said parts from obstructions.

4. A lawn mower as in claim 1, comprising a pair of rollers disposed behind the ground wheels, means for adjusting the elevation of said rollers for varying the elevation of the cutting means, and a latch member for supporting the lawn mower handle in substantially an upright position relatively to the lawn mower frame whereby the lawn mower may be tilted rearwardly and supported on said rollers to be conveyed thereon when not in use.

5. A lawn mower comprising a frame including a substantially flat base plate having upset sides, an axle journaled in said sides, ground wheels keyed to the ends of said axle, the forward edge of said plate being toothed to form a fixed cutting member, a reciprocating toothed cutting member slidably mounted on the fixed cutting member, a pedestal mounted on said base plate and provided with a bearing, a perpendicular shaft journaled in said bearing, an electric motor mounted on the lawn mower and provided with a driven shaft, gears connecting said shafts, eccentric means associated with said perpendicular shaft for reciprocating the slidably mounted cutting member, an axle journaled in the sides of said frame and provided with pinions on its ends, said ground wheels being provided with internal gears for meshing with said pinions, gear means for connecting said perpendicular shaft to said last mentioned axle for driving the ground wheels for propelling the lawn mower, and a clutch for engaging and disengaging said last mentioned gear means and said last mentioned axle.

6. A lawn mower as in claim 5, said eccentric means including a circular member eccentrically connected to the lower end of the perpendicular shaft, and a socket member carried by the reciprocating cutting member for receiving said circular member, said socket member being elongated transversely of the reciprocating cutter and being of a width substantially equal to the diameter of said circular member.

7. A lawn mower as in claim 5, comprising means for normally holding the clutch in a released position, and manually operating means including a lever disposed adjacent the lawn mower handle for moving the clutch into an engaged position.

8. A lawn mower provided with a reciprocating cutter, an electric motor mounted thereon and having a horizontally disposed driven shaft, a perpendicularly disposed shaft journaled on the mower, beveled gears connecting said shafts, eccentric means connecting the perpendicular shaft to the reciprocating cutter, a second beveled gear mounted on the perpendicular shaft, a transversely disposed shaft connected to the ground wheels of the mower, and a beveled gear keyed to the transverse shaft and enmeshed with the last mentioned beveled gear.

WILLIAM C. KLEIN.